June 1, 1965   M. J. GREEN   3,186,453
AUTOMATIC APPARATUS FOR SAWING LOGS TO DESIRED LENGTHS
Original Filed May 1, 1959   5 Sheets-Sheet 2

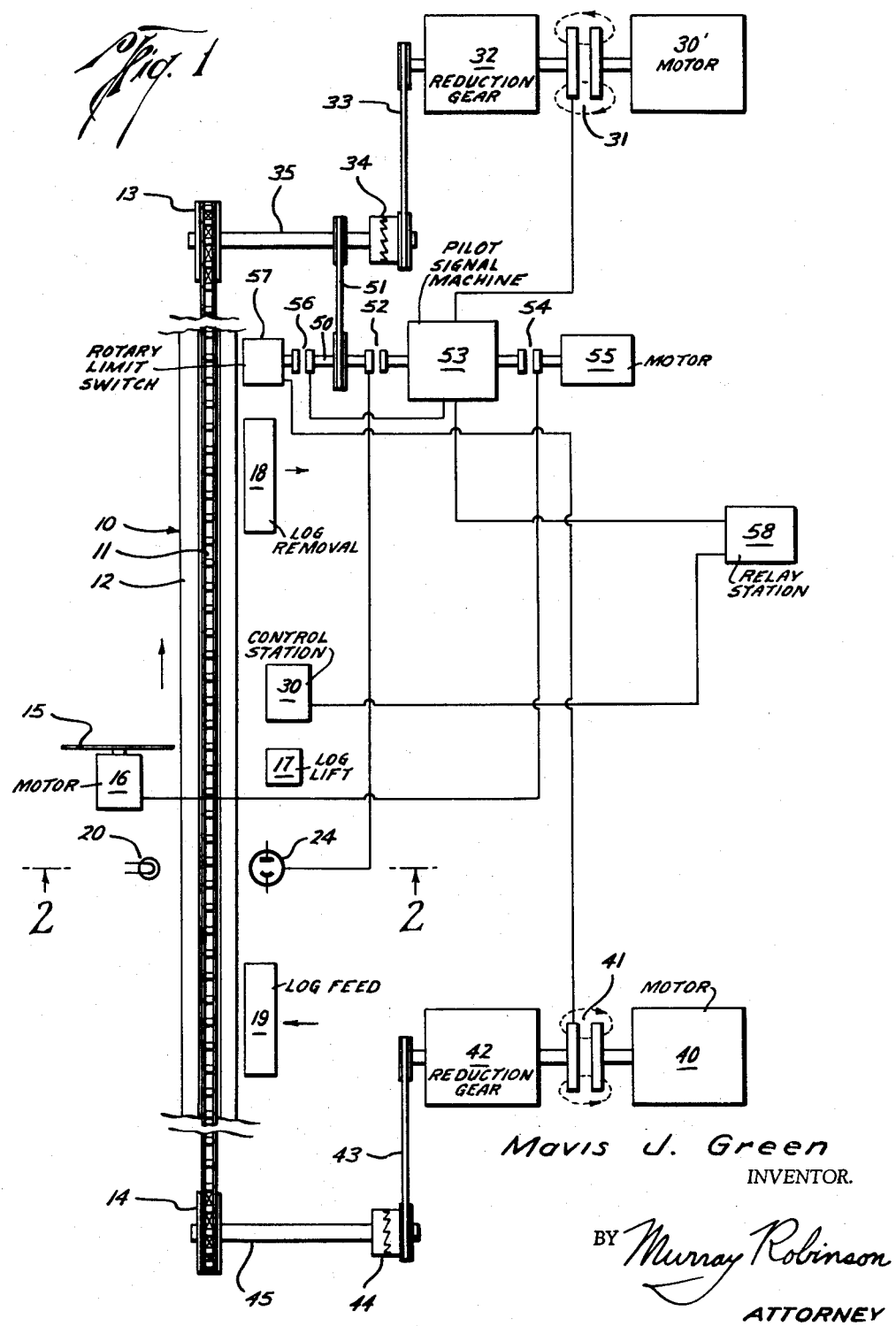

Mavis J. Green
INVENTOR.

BY Murray Robinson
ATTORNEY

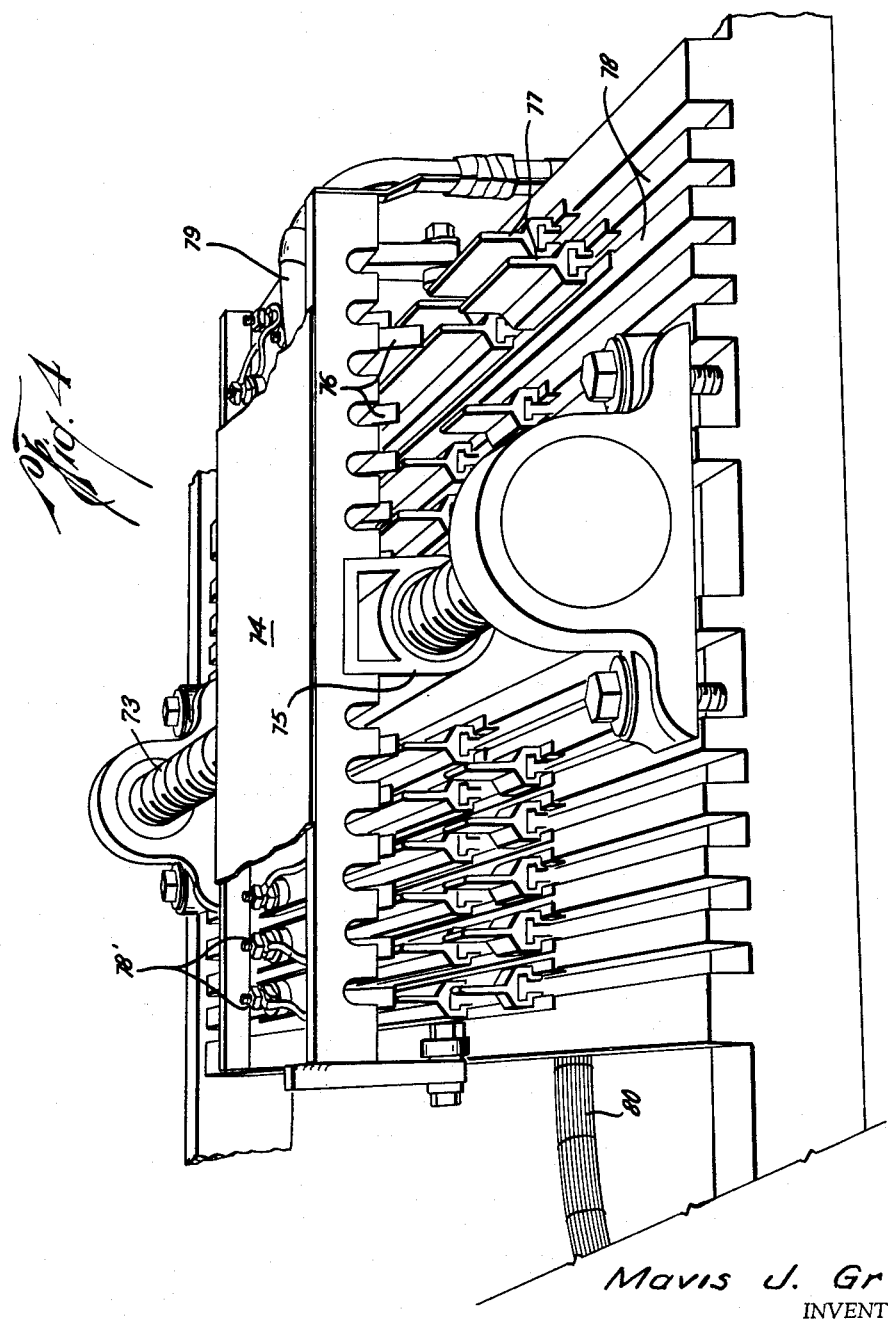

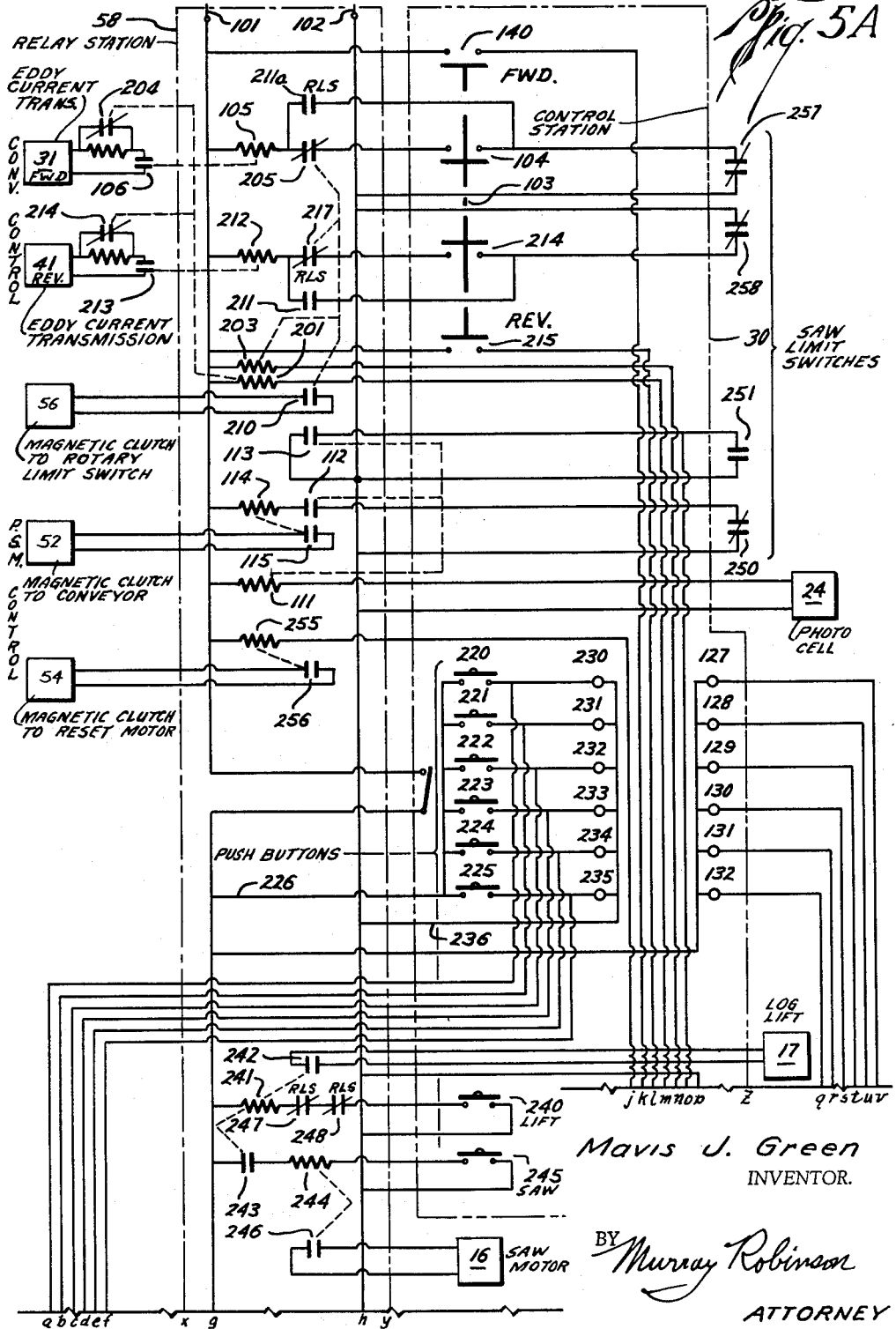

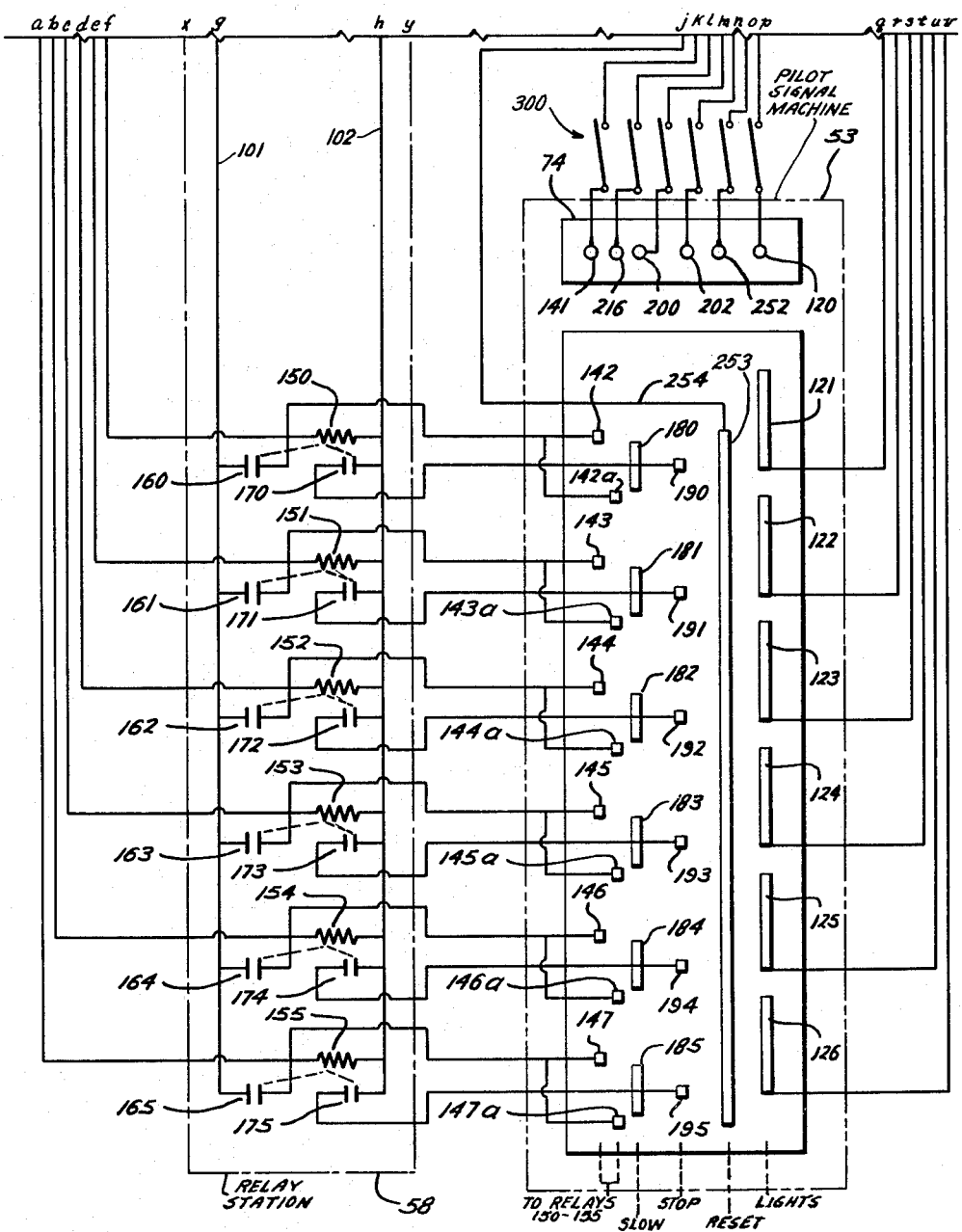

United States Patent Office 3,186,453
Patented June 1, 1965

3,186,453
AUTOMATIC APPARATUS FOR SAWING LOGS
TO DESIRED LENGTHS
Mavis J. Green, Bellaire, Tex., assignor to H. E.
Bovay, Jr., Consulting Engineers, Houston, Tex.,
a partnership
Continuation of abandoned application Ser. No. 100,729,
Apr. 4, 1961, which is a continuation of application
Ser. No. 810,431, May 1, 1959. This application
May 9, 1963, Ser. No. 279,284
3 Claims. (Cl. 143—47)

This invention pertains to an apparatus for automatically sawing logs into desired lengths.

This application is a continuation of patent application Serial No. 100,729, now abandoned, filed April 4, 1961, which is a continuation of application Serial No. 810,431, now abandoned, filed May 1, 1959, and entitled "Automatic Apparatus for Sawing Logs to Desired Lengths."

Objects of the invention are to provide such an apparatus that is, at the same time, accurate and durable and easy to maintain.

A further object of the invention is to provide such an apparatus that is, flexible whereby the operator can easily shift from one length of cut to another, can leave the length decision to the last minute if desired, and can change his mind.

Another object of the invention is to provide such an apparatus that is rapid in operation.

Other objects and advantages of the invention will appear from the following description of a preferred embodiment thereof, reference being made to the accompanying drawings wherein:

FIGURE 1 is a semi-schematic plan view of an apparatus embodying the invention.

FIGURE 4 is a top view of the pilot signal machine; and

Figure 3:
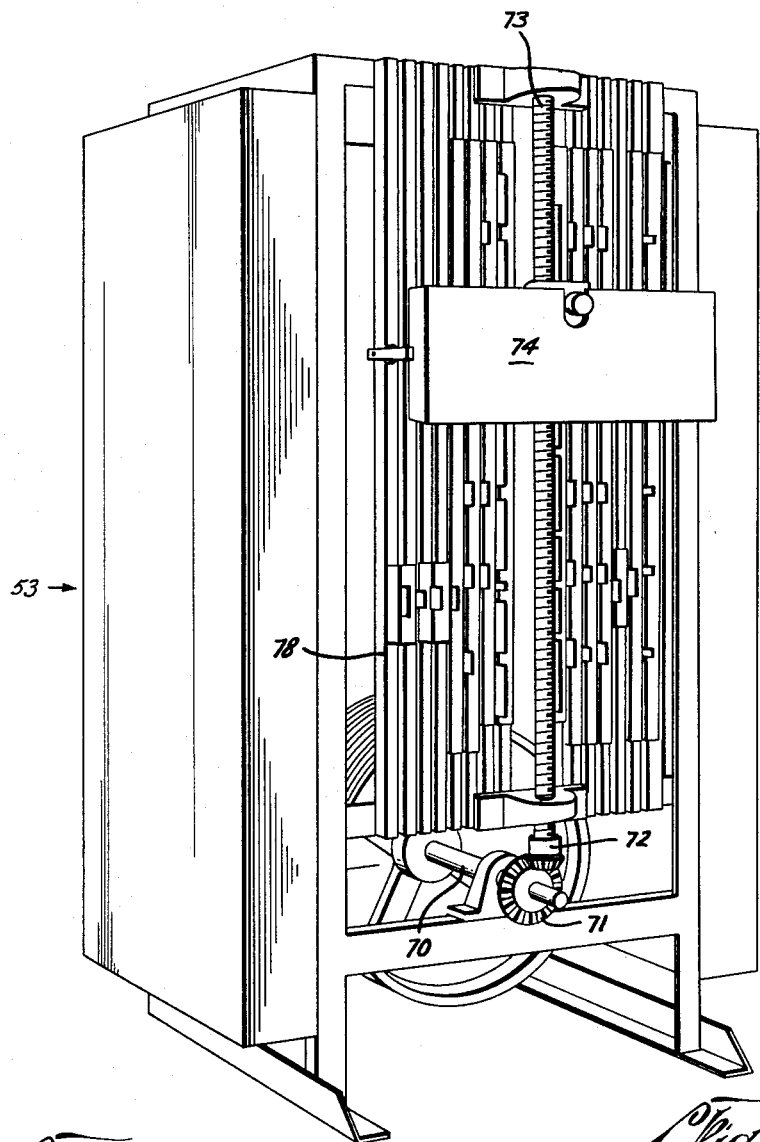
FIGURE 3 is a front elevation of a pilot signal machine used in the invention.

FIGURES 5a and 5b together form a wiring diagram of the apparatus shown in FIGURE 1.

Referring now to FIGURE 1 there is shown, schematically, a log conveyor 10 comprising an endless chain 11 whose upper course is slidably supported in the bottom of a guide trough 12. The chain 11 passes over forward and reverse drive sprockets 13 and 14 at the ends of the trough 12. A log deck saw 15 of any desired type, driven by motor 16, is disposed near the middle of conveyor 10, being adapted to be rotated by motor 16 and also moved by motor 16 transversely across the conveyor to cut a log disposed thereon. Logs will be fed to the conveyor upstream from the saw nearer the end at which sprocket 14 is located and will be removed therefrom on the downstream side of the saw nearer the end at which drive sprocket 13 is located. Suitable means 17 for lifting a log off the conveyor during the sawing operation is disposed ahead of the saw. Automatic means 18 will be provided for removing the logs from the conveyor, and also, if desired, means 19 may be provided for feeding them to the conveyor.

Figure 2:
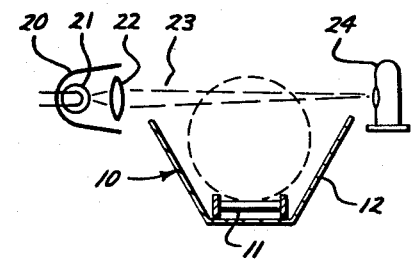
FIGURE 2 is a section on line 2—2 of FIGURE 1.

Upstream from the saw there is disposed log presence responsive means to initiate the operation of log positioning means later to be described. The log presence responsive means may be of any suitable type, such as a limit switch, but preferably, as shown best in FIGURE 2, comprises a light 21 with reflector 20 and lens 22 producing a beam 23 of light traversing the path of a log on the conveyor 10 and normally striking photo cell 24, the beam being subject to interruption by the presence of a log whereby the photo cell 24 is darkened and initiates operation of the log positioning means.

Adjacent the conveyor 10, preferably just downstream of the saw 15 is disposed a control station 30 at which is disposed means by which an operator can control the log positioning means to cause same to stop a log in a desired position adjacent the saw. Thereafter, either automatically without further action by the operator, or manually under his control if desired, the saw cuts off a portion of the log of the desired length and the log positioning means is reset ready for reactivation by the next log.

It is to be noted at this point that it is usual to make only one cut per log in the field so that after the first portion of the log is cut off to the desired length the conveyor is restarted and the remainder of the log carried past the saw and removed and the automatic log positioning device is not reactivated until the next log comes past the log responsive means. Should it be desired to make more than one cut per log suitable means could be provided to compensate for the distance between the log presence responsive means and saw in the operation of the log positioning means, for under such circumstances the log positioning means would be started with the log in position with its end adjacent the saw rather than adjacent the log presence responsive means. Or the operator could subtract that distance from the desired length of the second portion of the log before pushing the corresponding button on the control station or panel 30. Or by placing the log presence responsive means at the same position along the length of the conveyor as the saw, the problem can be eliminated entirely. It is preferred, however, to have the log presence responsive means upstream from the saw where it will not be subject to being covered with sawdust and will be less subject to vibration of the saw, this possibility being one of the features of advantage of the invention.

The log positioning means includes means for driving the conveyor forward (logs move downstream) including normally continuously running induction motor 30', eddy current variable speed transmission 31, reduction gears 32, chain and sprocket drive 33, overriding clutch 34, drive shaft 35, and sprocket 13. The log positioning means further includes means for moving the conveyor backwards (logs move upstream) including normally continuously running induction motor 40, eddy current variable speed transmission 41, reduction gears 42, chain and sprocket drive 43, overriding clutch 44, drive shaft 45, and sprocket 14. Finally the log positioning means includes control means for controlling the aforesaid means for moving the conveyor forward and backward.

The control means includes control shaft 50 connected to drive shaft 35 by chain and sprocket drive 51. By means of magnetic clutch 52 the control shaft may be connected to a pilot signal machine 53, which may be of any suitable type, such as the type 4C1 Signal Machine made by the K.M. White Company shown in FIGURE 3. The pilot signal machine may also be connected through magnetic clutch 54 to normally continuously running reset electric motor 55. Control shaft 50 may also be connected by means of magnetic clutch 56 to rotary limit switch 57. Pilot signal machine 53 is electrically connected through relay station 58 to the switches of control panel 30. All of the control means except the relay station consists of fairly rugged electromechanical elements, and except for control panel 30, may be located at a point remote from the conveyor and saw as determined by the length of chain drive 51. Relay station 58 may be located even more remotely if necessary. All portions of the control means as well as the means for moving the conveyor may be placed in concrete bunkers; this is particularly desirable for the relay station. It has been said that anything placed near a sawmill will soon break if not made of steel or concrete.

Referring now to FIGURE 3, the pilot signal machine 53 comprises a drive shaft 70 having a bevel gear 71 secured on one end thereof driving a bevel pinion 72 on the end of threaded shaft 73 which extends vertically at right angles to the end of shaft 70. A travelling carriage 74 includes a nut 75 (see FIGURE 4) disposed on shaft 73 to move up and down as the shaft is turned one way and the other and thereby move carriage 71 up and down. There are a plurality of moving contacts 76 on carriage 74 adapted to engage adjustably mounted fixed contacts 77 secured to vertical rails 78 disposed parallel to shaft 73. Binding posts 78' provide means to make connection with the moving contacts, the several wires connected to the binding posts being cabled together as shown at 79. Connections are made to the backs of fixed contacts 77 and cabled together as shown at 80.

Referring now to FIGURES 5A and 5B, power is supplied to the circuit through lines 101, 102. The conveyor is started by moving control lever 103 at the control station 30 to the forward position closing contacts 104. Closure of contacts 104 energizes relay 105. When relay 105 is energized it closes contacts 106 which closes the field circuit of transmission 31 to start the conveyor.

Where a log on the conveyor interrupts the light beam directed on photocell 24 it causes relay 111 to be de-energized, thus closing contacts 112 and opening contacts 113. Closure of contacts 112 energizes relay 114. When relay 114 is energized it closes contacts 115 which closes the field circuit of magnetic clutch 52 to start the pilot signal machine.

Further movement of the conveyor and log is now accompanied by proportional movement of traveling carriage 74 of the pilot signal machine and as moving contact 120, see FIG. 5B, of the traveling carriage moves successively over fixed contacts 121–126 it causes lights 127– 132, see FIG. 5A, to be lit successively to indicate to the operator at the control station the approximate position of the log. The first light 127 will be lit as soon as the log passes the photocell and will stay on until the log passes the point where it is too late to stop it to be sawed at the shortest standard length, e.g. 10 feet. After the log has passed the 10-foot position the second light 128 will light up and stay lit until it is too late to stop the log to saw it off at the next standard length, 12 feet. Lights 129– 132 will similarly light up in advance of log positions corresponding to 14, 16, 18 and 20 foot lengths.

If at any time a particular light is lit, the operator decides to cut off the log at the corresponding length he moves control lever 103 farther in the forward direction to close contacts 140. This connects moving contact 141 on the carriage 74 to one side of the power line. Contact 141 moves over fixed contacts 142–147 to successively close the circuits for relays 150–155. When relays 150– 155 are energized they respectively close hold in contacts 160–165 and main contacts 170–175. The main contacts 170–175 are connected to "slow down" fixed contacts 180–185 and to "stop" fixed contacts 190–195 on the pilot signal machine. The slow down contacts are traversed by traveling carriage contact 200, see FIG. 5B, which is connected to slow down relay 201, see FIG. 5A. The stop contacts are traversed by traveling carriage contact 202 which is connected to stop relay 203. Energization of relay 201 opens contacts 204 to insert additional resistance in the field circuit of eddy current transmission 31 to cause the conveyor to slow down. Energization of relay 203 opens contacts 205 to deenergize relay 105 and open contacts 106 to de-energize the field of the eddy current transmission 31 and cause the conveyor to stop. Thus when the operator moves control lever 103 to close contacts 140, as soon as the traveling carriage contact 200 engages the next one of the slow down contacts the conveyor is slowed down, and when traveling carriage contact 202 engages the next stop contacts the conveyor stops.

Energization of stop relay 203 also closes contacts 210 to energize magnetic clutch 56 which connects rotary limit switch 57 to the drive shaft 50 of the pilot signal machine. In the event of overtravel of the conveyor beyond the desired position, a rotary limit switch contacts 211 close energizing relay 212 whose contacts 213 close to energize eddy current transmission 41 to drive the conveyor backwards until contacts 211 reopen. It is to be noted that transmission 41 will only be energized for low speed drive of the conveyor because slow down relay 201, FIG. 5A, is still energized keeping contacts 214 open to insert resistance in the field circuit of transmission 41.

After the conveyor and log have come to rest if the operator decides he has allowed the log to travel too far, he can move control lever 103 in the opposite direction to close contacts 214 energizing relay 212 to cause the conveyor to reverse. When it is desired to stop the conveyor at the position corresponding to the next standard length the control lever 103 is moved farther in the same direction to close contacts 215 connecting line 101 to moving contact 216 on traveling carriage 74. Contact 216 moves successively over contacts 142a–147a, which are connected respectively to contacts 142–147 but disposed on the opposite sides of the slow down contacts 180– 185 and stop contacts 190–196. It will be noted that the slow down contacts extend on both sides of the stop contacts which are respectively midway therebetween. As soon as moving contact 216 engages the next one of fixed contacts 142a–147a, it completes the circuit to line 102 through the corresponding one of relays 150– 155 which closes its corresponding hold in contact and main contact the same as when the signal machine was moving in the forward direction and its contact 141 engaged one of contacts 142–147. Thereafter when contacts 200 and 202 engage the corresponding slow down and stop contacts, the relays 201 and 203 are actuated as before. Relay 201 opens contacts 214 to slow down the conveyor and then relay 203 opens contacts 217 to stop the conveyor. Overtravel adjustment is the same as in the forward direction.

Instead of waiting until the log has moved almost to the desired position for sawing and then moving the control lever 103 to cause the log automatically to stop at the precise location to be cut to the next standard length, if the operator knows in advance what length he wishes he can close momentarily one of the push button switches 220–225, a circuit will immediately be closed from line 101 through conductor 226 to the corresponding one of the signal lights 230–235 and thence through conductor 236 back to line 102, thus showing which button was actuated. Since relays 150–155 respectively are in parallel with lights 230–235, the corresponding one of these relays will simultaneously be energized the same as if it had been energized by throwing control lever 103 to close contacts 140 and waiting for moving contact 141 of the traveling carriage to engage the corresponding one of fixed contacts 180–185 as previously described. Energization of the particular one of relays 150–155 will, as before, close the corresponding one of hold in contacts 160–165 so that the relay remains energized and the corresponding one of signal lights 230–235 remains lit even after the actuated one of the push buttons 220–225 is released.

It may be noted here that the corresponding one of signal lights 230–235 will be lit when any one of relays 150–155 is energized whether the relay is energized through one of the push buttons 220–225 or through the moving contact 141 of the pilot signal machines so that in both cases a signal light will indicate to the operator which relay was actuated.

When a particular one of relays 150–155 has been energized by actuation of one of push buttons 220–225, it closes the corresponding one of contacts 170–175 so that when moving contacts 200 and 202 engage the corresponding ones of slow down contacts 180–185 and stop contacts 190–195, the conveyor contacts 180–185 and stop contacts 190–195, the conveyor is automatically slowed down and stopped the same as in the case of actuation of lever 103, the only difference being that actuation of lever 103 causes the conveyor to stop immediately at the next position corresponding to a standard length whereas actuation of one of pushbuttons 220–225 causes the conveyor to stop at a seated position corresponding to the desired standard length and such position will not usually be the next standard position the log comes to so that the log may pass several standard positions before coming to rest. In the latter case, the log position indicating lights 127–132 will successively light up and if disposed opposite the signal lights 230–235 then when the indicator light lights up opposite the previously lit signal light the operator will know the conveyor is about to stop and it is time to get ready to saw the log.

The preset automatic positioning means just described works equally well whether the log and conveyor are moving forwards or backwards.

When the conveyor has come to rest with a log in a desired position, the operator actuates push button switch 240 which energizes relay 241, causing contacts 242 to close and actuate electric log lifting means 17. Energization of relay 241 also closes contacts 243 in series with saw relay 244 preparing it for energization when push button 245 is actuated. Energization of relay 244 closes contacts 246 to start saw motor 16. Contacts 247 and 248, actuated by rotary limit switch 56 to open when the log is in advance or behind the desired position are in series with log lift relay 241 to prevent its actuation if the log is not in the proper position.

Actuation of the saw causes limit switch 250 to open, thereby de-energizing relay 114 and opening contacts 115 to de-energize magnetic clutch 52 and disconnect the pilot signal machine from the conveyor. At the same time movement of the saw closes limit switch 251 connecting line 102 to moving contact 252 of traveling carriage 74 which, through fixed contact 253 of the signal machine and conductor 254 closes a circuit to line 101 through reset relay 255. Energization of relay 255 closes contacts 256 which energizes magnetic clutch 54 to connect the pilot signal machine to motor 55 and drive the traveling carriage back to its initial position, whereupon moving contact 252 leaves fixed contact 253 and the signal machine comes to rest. Actuation of the saw also opens limit switches 257, 258 to insure that the circuits to relays 105 and cannot be actuated to move the conveyor while the saw is in operation.

After the log is cut in two the operator releases the saw push button 245 and the saw automatically returns to its rest position whereupon the operator releases the log lift push button 240 and the log is dropped back on to the conveyor. Movement of control lever 103 to close contacts 104 again energizes relay 105, the saw limit switch contacts 257 being closed again since the saw is no longer in operation. Energization of relay 105 again causes the conveyor to move forward and carries the remainder of the log past the saw. As long as the log is blocking the light beam on the photo cell the traveling carriage of the pilot signal machine will be actuated, and this will be the case if less than half of the log was cut off. However, as soon as the end of the log passes and the photo cell is again illuminated, relay 111 will be energized and contacts 112 will open to de-energize relay 114 and disconnect clutch 52 and at the same time contacts 113 will close to connect line 102 to moving contact 252 of the traveling carriage to connect line 101 to relay 255 through fixed contact 253 and thereby engage clutch 54 to reset the traveling carriage at its initial position.

The conveyor then carries the next log to operate the photocell and begin the sequence of operations once again.

While a preferred embodiment of the invention has been shown and described, many modifications therein could be made by one skilled in the art without departing from the spirit of the invention and it is desired to protect by Letters Patent all forms of the invention falling within the scope of the following claims.

I claim:

1. Apparatus for sawing logs comprising a log conveyor, a saw disposed adjacent the conveyor, means to start the conveyor in motion to carry a log to the saw, pilot signal means, means responsive to the presence of a log on said conveyor at a particular position relative to said saw to start said pilot signal means, means controlled by the pilot signal means to bring the conveyor to rest in any selected one of a plurality of positions relative to the saw corresponding to desired lengths to which the log can be cut, and operator actuated means to control the pilot signal means to select the particular one of said positions at which the conveyor is brought to rest, said operator actuated means comprising a plurality of control members, means responsive to actuation of each of said control members as soon as said pilot signal means has been started to control the pilot signal means to cause the conveyor to stop in a different one of said positions, two sets of signal lights, each set including one light for each of said positions, means controlled by said pilot signal machine to light up successively the lights in one of said sets corresponding to the next nearest of said positions as said conveyor carries the log to the saw, and means actuated by said operator actuated means to light up the one of the other set of lights corresponding to the position at which the conveyor will stop.

2. Apparatus for sawing logs comprising a log conveyor including a chain traveling over a support, a drive sprocket engaging said chain, a drive shaft on which said sprocket is mounted, a drive motor, an eddy current variable speed transmission for connecting said motor and shaft, an auxiliary shaft means coupling the auxiliary shaft to said drive shaft, a pilot signal machine, a first magnetic clutch for coupling said machine to said auxiliary shaft, a rotary limit switch having a shaft, a second magnetic clutch for coupling said rotary limit switch shaft to said auxiliary shaft, a reset motor having a shaft, a third magnetic clutch for coupling said reset motor shaft to said pilot signal machine, a switch for energizing said eddy current transmission to drive said conveyor, a saw adjacent the conveyor, a photocell adjacent the conveyor upstream from the saw, means forming a beam of light crossing above said conveyor in the path of a log carried by the conveyor and falling on the photocell, means actuated by a log interrupting said light beam to energize the first said magnetic clutch to cause the pilot signal machine to move with the conveyor means controlled by the pilot signal machine to bring the conveyor to rest with the log in position to be sawed and to energize said second magnetic clutch to couple said rotary limit switch to said auxiliary shaft, means responsive to actuation of said rotary limit switch in case of overtravel of said conveyor beyond said rest position to drive said conveyor back to the desired position, the last said means including a second drive sprocket engaging said chain, a second drive shaft on which said second drive sprocket is mounted, a second eddy current variable speed transmission for connecting said second drive motor and said second drive shaft, the last said means energizing said second eddy current transmission when said rotary limit switch is actuated, and means responsive to actuation of said saw for de-energizing said first and second clutches and energizing said third clutch to reset said pilot signal machine in its initial position.

3. Apparatus defined by claim 1 wherein said pilot signal means includes a switching mechanism having a first set of movable contacts and a second set of stationary contacts, said second set of stationary contacts being adjustable to vary the sequence of closure between said first set of contacts and said second set of contacts.

References Cited by the Examiner
UNITED STATES PATENTS

| | | |
|---|---|---|
| 1,944,761 | 1/34 | Rutemiller et al. |
| 2,387,650 | 10/45 | Davis _____ 83—209 |
| 2,642,663 | 6/53 | Long. |
| 2,696,853 | 12/54 | Balch et al. |
| 3,013,459 | 12/61 | Coleman. |

LESTER M. SWINGLE, *Primary Examiner.*

WILLIAM W. DYER, Jr., *Examiner.*